(12) United States Patent
Weeks (10) Patent No.: US 9,576,577 B2
(45) Date of Patent: Feb. 21, 2017

(54) SYSTEMS AND METHODS FOR TRANSCRIPTION TRANSFER

(71) Applicant: Dolby & Company, Inc., Cincinnati, OH (US)

(72) Inventor: Curtis A. Weeks, Loveland, OH (US)

(73) Assignee: Dolby & Company, Inc., Cincinnati, OH (US)

(*) Notice: Subject to any disclaimer, the term of this patent is extended or adjusted under 35 U.S.C. 154(b) by 137 days.

(21) Appl. No.: 14/624,833

(22) Filed: Feb. 18, 2015

(65) Prior Publication Data

US 2015/0340036 A1 Nov. 26, 2015

Related U.S. Application Data

(60) Provisional application No. 62/002,436, filed on May 23, 2014.

(51) Int. Cl.
  *G10L 15/26* (2006.01)
  *G10L 15/04* (2013.01)
  *G06F 3/0486* (2013.01)

(52) U.S. Cl.
  CPC ............ *G10L 15/26* (2013.01); *G06F 3/0486* (2013.01)

(58) Field of Classification Search
  CPC ......... G10L 15/22; G10L 15/19; H04M 11/00; H04M 2201/22; H04M 2203/253
  USPC ............... 704/235, 243, 245, 246, 250, 251, 260,704/270, 270.1
  See application file for complete search history.

(56) References Cited

U.S. PATENT DOCUMENTS

| | | | | |
|---|---|---|---|---|
| 5,956,681 A | * | 9/1999 | Yamakita | H04M 1/72552 704/231 |
| 6,477,493 B1 | * | 11/2002 | Brooks | G10L 15/063 704/243 |
| 8,155,957 B1 | * | 4/2012 | Takens | G10L 15/22 369/25.01 |

* cited by examiner

Primary Examiner — Charlotte M Baker
(74) Attorney, Agent, or Firm — Dinsmore & Shohl LLP (57) ABSTRACT

Included are systems and methods for transcription transfer. In some embodiments a method includes receiving text data in an electronic format, determining a header in the text data, and in response to determining the header in the text data, determining a segment associated with the header. Some embodiments may include providing a dialog box associated with the text data, where the dialog box includes a first option for inserting the segment into a user interface provided by a destination application, receiving a user selection of the first option, and inserting the segment into a predetermined portion of the user interface provided by the destination application.

20 Claims, 8 Drawing Sheets

PATH SYSTEM (EXAMPLEEMR) - GROSS PATHOLOGY REPORT - DEMO, PATIENT

PATIENT
NAME: DEMO PATIENT
SSN#: 999-99-9999
DOB: 1/1/1990

TEMPERATURE: 98.5°  PULSE RATE: 68  BLOOD PRESSURE: 120/85  RESPIRATORY: 16

PATH SYSTEM (EXAMPLEEMR) - GROSS PATHOLOGY REPORT
CLINICAL HISTORY
PROBABLE RIGHT UPPER LOBE LUNG CARCINOMA. ← 434

■ FUSION SMART TRANSFER — 430b
⊙ <Ctr-1> GROSS DESCRIPTION
○ <Ctr-2> FINAL DIAGNOSIS
○ <Ctr-3> COMMENTS
MOUSE DOUBLE-CLICK: INSERT NEXT SECTION'S TEXT
DRAG AND DROP OR LISTED KEY: INSERT ASSOCIATED TEXT
<Ctrl+0>: INSERT ALL TEXT. ESC: CLOSE — 430a

GROSS DESCRIPTION

FINAL DIAGNOSIS

FINISH
☐ PRESCRIBE                    ☑ SIGN  ✗ CANCEL

SYSTEMS AND METHODS FOR TRANSCRIPTION TRANSFER

CROSS REFERENCE

This application claims the benefit of U.S. Provisional Ser. No. 62/002,436, filed May 23, 2014, which is hereby incorporated by reference in its entirety.

BACKGROUND

Field

Embodiments provided herein generally relate to systems and methods for transcription transfer, and particularly embodiments for communicating transcribed data from a first application to a second application.

Technical Background

In many professions, dictation (and thus transcription) is a valuable process for documenting events. As an example, in the medical field, physicians often dictate medical diagnoses and/or other information related to the medical practice. While this process may be beneficial for computing the dictated information, there are often difficulties in transferring the transcribed data from the transcription application to a destination application. Additionally, while current solutions utilize "cut and paste" functionality that is provided with many operating systems and word processors, this generic formatting functionality often proves inefficient with regard to solving this deficiency in the art.

SUMMARY

Included are systems and methods for transcription transfer. In some embodiments a method includes receiving text data in an electronic format, determining a header in the text data, and in response to determining the header in the text data, determining a segment associated with the header. Some embodiments may include providing a dialog box associated with the text data, where the dialog box includes a first option for inserting the segment into a user interface provided by a destination application, receiving a user selection of the first option, and inserting the segment into a predetermined portion of the user interface provided by the destination application.

In another embodiment, a system for transcription transfer may include a user computing device that includes a processor and a memory component, the memory component storing a transcription application and a destination application. When the transcription application is executed by the processor, the system may be configured to determine text data associated with audio data received from a user, determine a segment of the text data, and provide a dialog box associated with the text data, where the dialog box includes an option associated with the segment. In some embodiments, the transcription application may be configured to receive a user selection of the option and send text data associated with the segment to a predetermined portion of a user interface provided by the destination application.

In yet another embodiment, a non-transitory computer-readable medium for transcription transfer may include logic that, when executed by a computing device, causes the computing device to receive audio data from a user, transcribe the audio data to create text data associated with audio data, insert the text data into a user interface associated with a transcription application, and determine a header in the text data. In some embodiments, the logic causes the computing device to determine, from the header, a segment of the text data and provide a dialog box associated, where the dialog box includes an option for inserting the segment into a user interface provided by a destination application. In still some embodiments, the logic causes the computing device to receive a user selection of the option and insert text data associated with the segment into a predetermined portion of the user interface provided by the destination application.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein may be configured to transcribe a dictation and allow a user to easily transfer the text into another application. This may include the use of front-end and/or back-end speech recognition, transcription software for providing a user interface of dictated text, and a destination application, such as a word processing application for receiving the transcribed text. Additionally, embodiments may be configured to determine and/or provide reports related to line counts and productivity related to the text.

Similarity, embodiments disclosed herein may provide a customizable and flexible buffer between the transcription application and the destination application. The transcription application may be configured to allow a transcription to be segmented and allow those segments to be dragged and dropped (or deployed through a variety of mechanisms including clicks/ctrl keys/etc.) into the destination application in a user-defined order.

Embodiments described herein may also include scripts (such as process scripts) that allow custom actions to be performed when a report is opened, created, and/or ended. The process script may be assigned in user management interface and may be enabled by specifying an exit or entry process for the report type. Upon completing the document, the scripting may provide the ability to parse out a section (by header) of the document and insert the text to a user interface for the destination application or display and/or provide a transfer dialog box to facilitate inserting the sections of text to a target text area of the destination application. Embodiments may be utilized as part of an overall solution between the destination application and a transcription application.

It should also be understood that while some embodiments are configured to transcribe audio data, this is not a requirement. Some embodiments may be configured to receive text-based documents from another computing device. In such embodiments, a user may utilize the functionality described herein to transfer the received text to the destination application.

Figure 1:
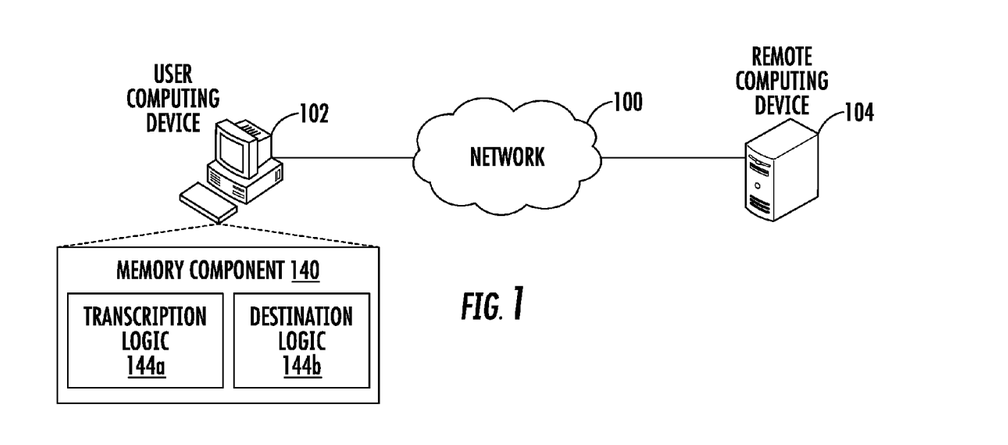
FIG. 1 depicts a computing environment for transcription transfer, according to one or more embodiments shown and described herein.

Referring now to the drawings, FIG. 1 depicts a computing environment for transcription transfer, according to one or more embodiments shown and described herein. As illustrated, the computing environment may include a network 100, which may include a wide area network (wired or wireless), such as the internet, a cellular network, or other communications network for communicating devices across a wide area. Additionally, the network 100 may include a wired or wireless local area network for communicating data, as described herein.

Coupled to the network 100 is a computing device, such as a user computing device 102 and a remote computing device 104. The user computing device 102 may be configured for users, such as medical providers, attorneys, and/or other users to dictate and/or transcribe text. As discussed in more detail below, the user computing device 102 may additionally interface with the remote computing device 104 to receive a back end transcription and/or other data.

The remote computing device 104 may include a memory component 140 that stores transcription logic 144*a* and destination logic 144*b*. The transcription logic 144*a* may include one or more components, such as for receiving audio data that has been dictated by a user, as well as transferring the transcription to the destination application as described in more detail herein. The destination logic 144*b* may be configured to provide a destination application, such as a word processing editor and/or other program for receiving typewritten text. It should be understood that (in some embodiments) the destination application may be a standard piece of software that is not specifically configured to interface with the transcription application. As a consequence, embodiments described herein may be configured to provide the desired functionality to any of a plurality of different destination applications.

Figure 2:
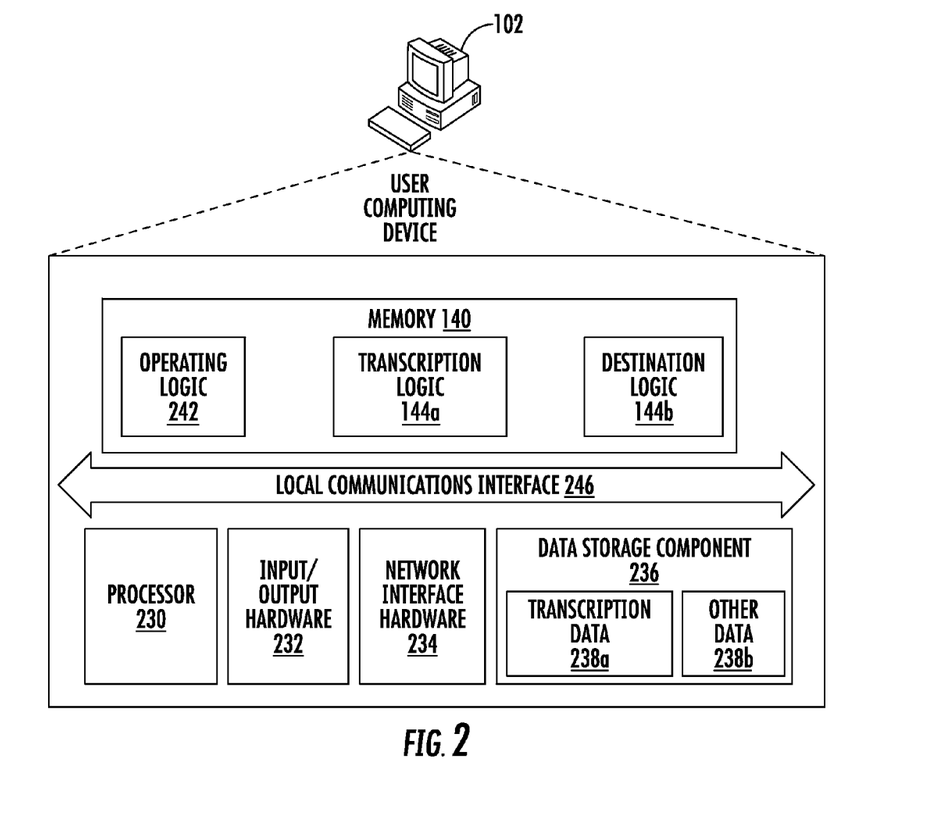
FIG. 2 depicts a remote computing device for transcription transfer, according to one or more embodiments shown and described herein.

FIG. 2 depicts a user computing device 102 for transcription transfer, according to one or more embodiments shown and described herein. As illustrated, the user computing device 102 includes a processor 230, input/output hardware 232, a network interface hardware 234, a data storage component 236 (which stores transcription data 238*a*, and/or other data 238*b*), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. Depending on the particular embodiment, these non-transitory computer-readable mediums may reside within the user computing device 102 and/or external to the user computing device 102.

The memory component 140 may store operating logic 242, the transcription logic 144*a*, and the destination logic 144*b*. Each of these logic components may include a plurality of different pieces of logic, each of which may be embodied as a computer program, firmware, and/or hardware, as an example. A local interface 246 is also included in FIG. 2 and may be implemented as a bus or other communication interface to facilitate communication among the components of the user computing device 102.

The processor 230 may include any processing component operable to receive and execute instructions (such as from a data storage component 236 and/or the memory component 140). As described above, the input/output hardware 232 may include and/or be configured to interface with the components of FIG. 2.

The network interface hardware 234 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the user computing device 102 and other computing devices.

The operating logic 242 may include an operating system and/or other software for managing components of the user computing device 102. As discussed above, the transcription logic 144*a* may reside in the memory component 140 and may be configured to cause the processor 230 to receive audio data, receive and/or otherwise transcribe the audio data, and provide a dictation as text of the audio data. The destination logic 144*b* may be configured to cause the processor 230 to provide a destination application, such as word processing and/or other programs for receiving textual data. As discussed above, the destination application may be a standard word processing (or other) application that is not specifically configured to communicate with the transcription application.

It should be understood that while the components in FIG. 2 are illustrated as residing within the user computing device 102, this is merely an example. In some embodiments, one or more of the components may reside external to the user computing device 102 or within other devices, such as the remote computing device 104. It should also be understood that, while the user computing device 102 is illustrated as a single device, this is also merely an example. In some embodiments, the transcription logic 144*a* and the destination logic 144*b* may reside on different computing devices. As an example, one or more of the functionalities and/or components described herein may be provided by the user computing device 102 and/or the remote computing device 104.

Additionally, while the user computing device 102 is illustrated with the transcription logic 144*a* and the destination logic 144*b* as separate logical components, this is also an example. In some embodiments, a single piece of logic may provide the described functionality. It should also be understood that while the transcription logic 144*a* and the destination logic 144*b* are described herein as the logical components, this is also an example. Other components may also be included, depending on the embodiment.

Figure 3:
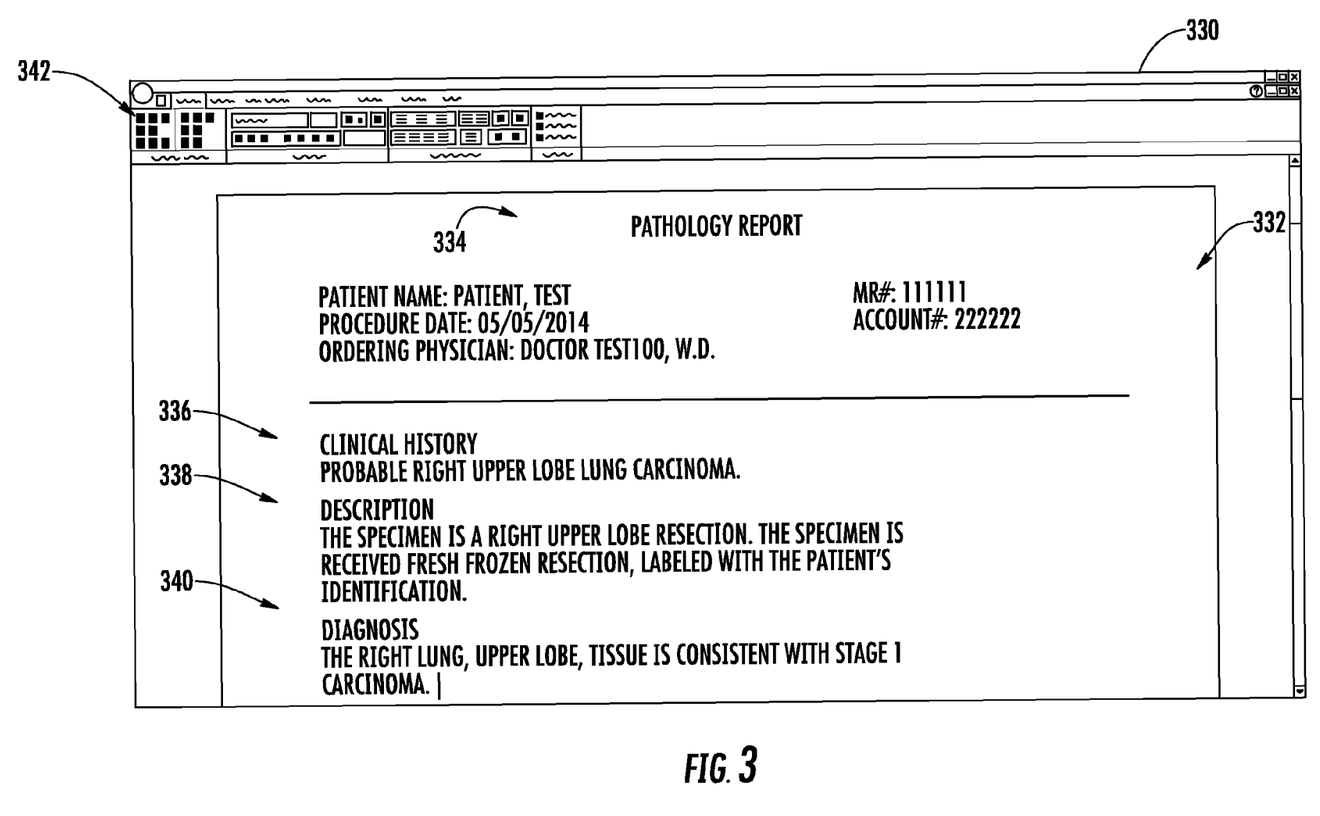
FIG. 3 depicts a user interface of a transcription application for receiving dictated and transcribed data, according to one or more embodiments shown and described herein.

FIG. 3 depicts a user interface 330 of a transcription application for receiving dictated and transcribed data, according to one or more embodiments shown and described herein. As illustrated, a transcription application may provide the user interface 330 for receiving text data. In some embodiments, a dictation may be received from a user and transcribed either by another user, by the transcription logic 144*a*, and/or by the remote computing device 104. Upon transcription, the audio data may be divided into segments and provided as text data in a text area 332. As illustrated, the text data includes a plurality of segments, such as an introductory segment 334, a critical history segment 336, a description segment 338, and a diagnosis segment 340. These segments may be described in the dictation and divided out as depicted in FIG. 3 and/or may be edited by a user after transcription has occurred. Regardless, the segments may be designated by formatting differences, such as bold, capitalized letters, ending a line with a colon or other designation, via metadata, and/or via other similar mechanism. Once the transcription is complete, the user may select a complete option 342.

Figure 4:
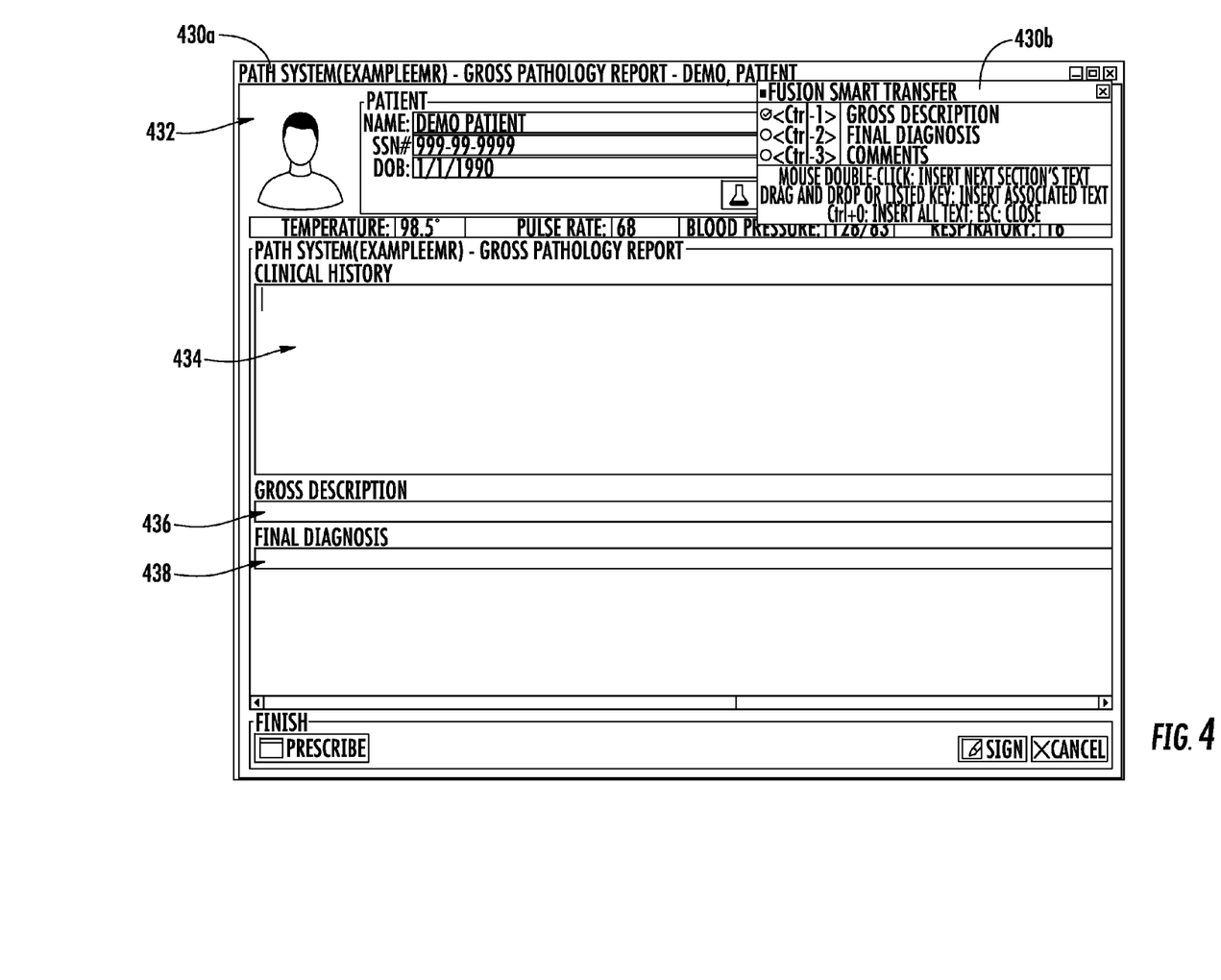
FIG. 4 depicts a user interface of a destination application for a transcribed document, according to one or more embodiments shown and described herein.

FIG. 4 depicts a user interface 430*a* of a destination application for a transcribed document, according to one or more embodiments shown and described herein. As illustrated, the destination application may provide the user interface 430*a*. The destination application may include medical software, word processing software, and/or other software that a user may enter text data into predetermined fields. As also illustrated, the user interface 430 may include a patient information section 432, a clinical history section 434, a gross description section 436, and a final diagnosis section 438. Also provided in the example of FIG. 4 is a dialog box 430*b* that is provided by the transcription application. Specifically, upon selection of the complete option 342 from FIG. 3, the transcription application may determine one or more segments of the text data. The dialog box 430*b* may also be provided, which includes an option related to at least one of the segments (and which may correspond to the sections 434-438 in the user interface 432*a*). Accordingly, the user may select one or more of the options from the dialog box 430*b* for inserting the corresponding text into a corresponding section 434-438 of the user interface 430*a* provided by the destination application. In some embodiments, the dialog box 430*b* may also provide hotkeys for a user to select for inserting the segment into the user interface 430*a*.

Figure 5:
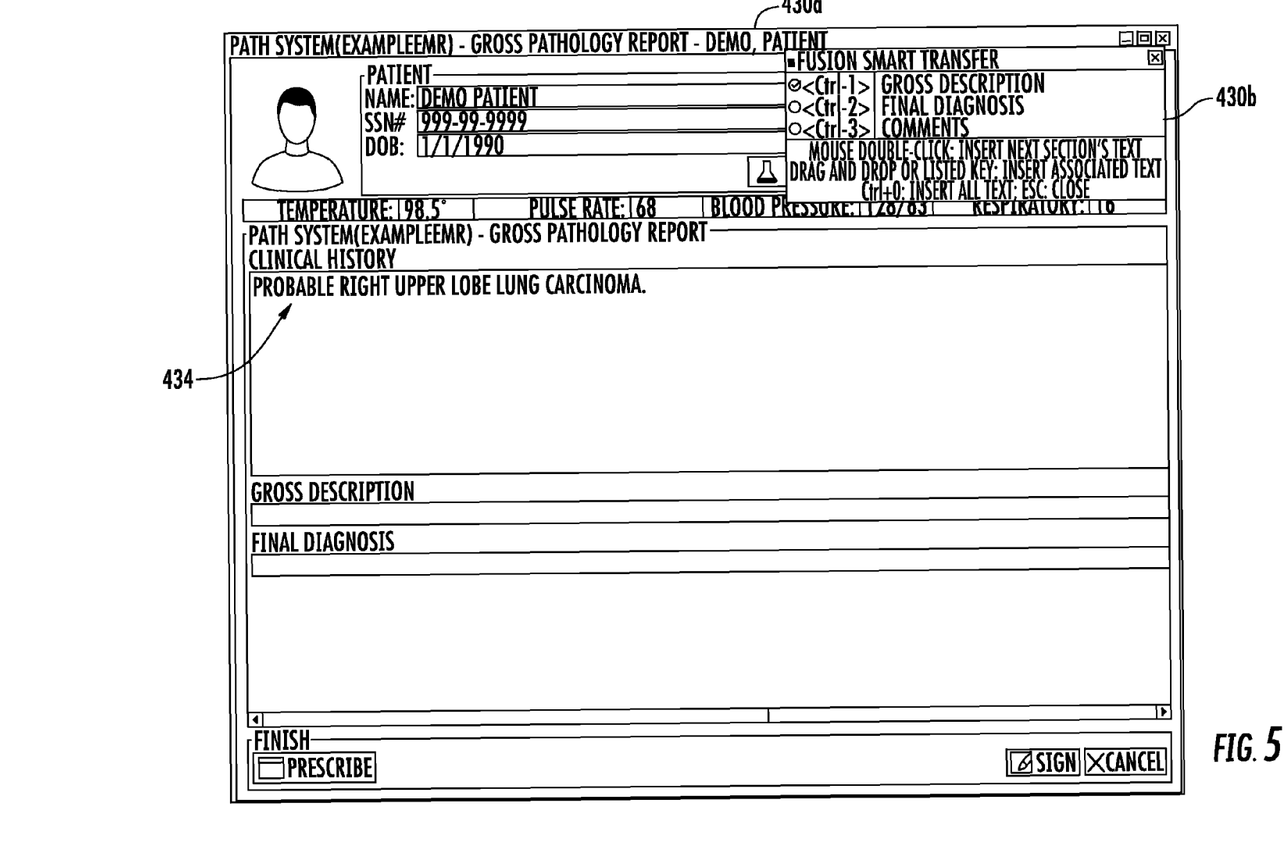
FIG. 5 depicts a user interface of the destination application, with text from the transcription application, according to one or more embodiments shown and described herein.

FIG. 5 depicts the user interface 430*a* of the destination application, with text from the transcription application, according to one or more embodiments shown and described herein. As illustrated, in response to selection of an option in the dialog box 430*b*, a respective segment of the text data from the user interface 330 (FIG. 3) may be inserted into the user interface 430*a* at a predetermined section. The predetermined section may be determined by a cursor position, a mouse position, and/or other predetermined mechanism. Additionally, some embodiments may be configured to identify segments designated in the document of the user interface 330 (FIG. 3) by a header and then correspond a field header in the user interface 430*a* of the destination application for automatic insertion (or suggestion) into the determined field. As an example, if the header in the text data from FIG. 3 includes the word "diagnosis" and the user interface 430*a* includes a field entitled "diagnosis," the transcription application may be configured to cause the respective segment of text data to be automatically inserted into the diagnosis field of the user interface 430*a* (or suggest insertion to the user) without providing a dialog and/or without receiving user input.

Figure 6A:
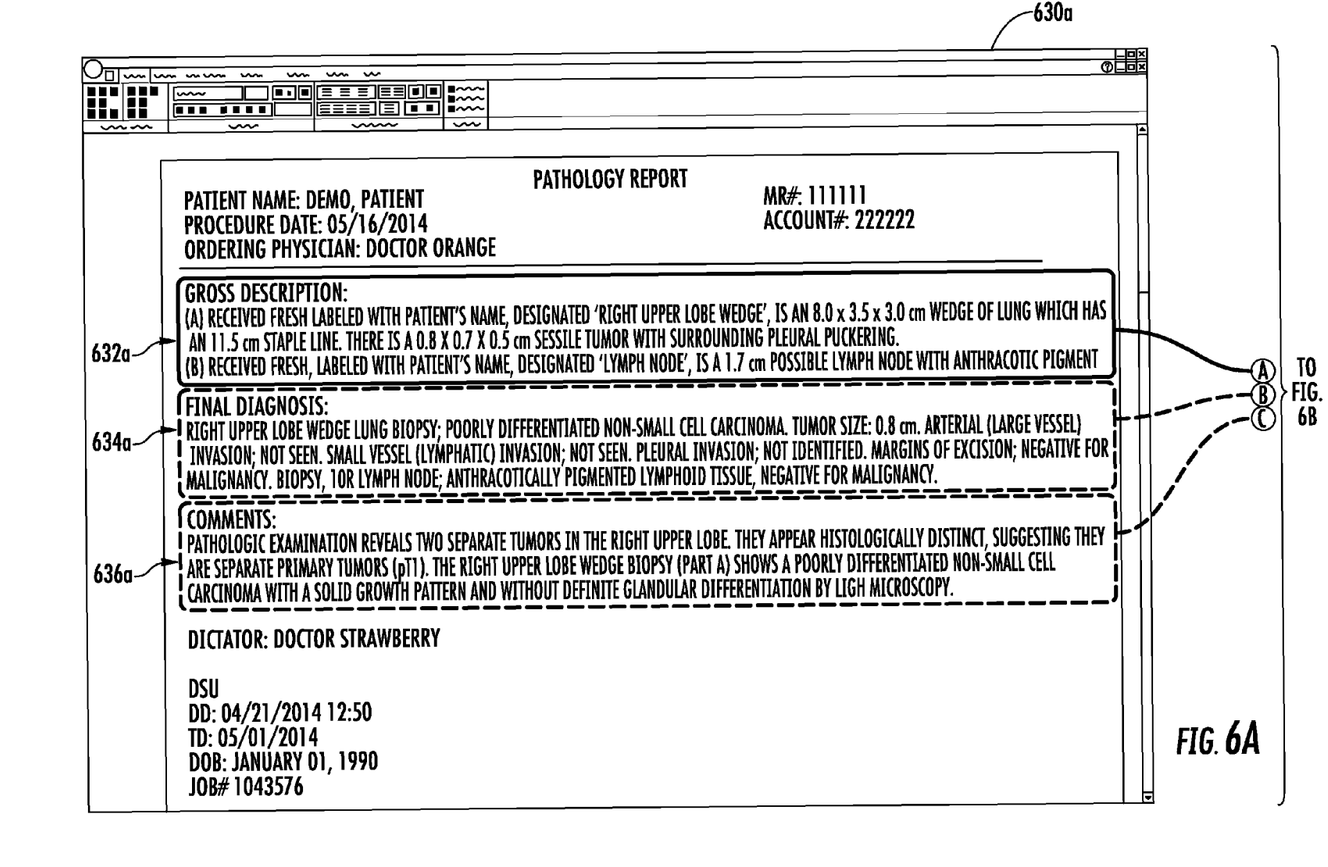
FIGS. 6A-6B depict user interfaces of the transcription application and the destination application with a dialog box for transferring portions of text to the destination application, according to one or more embodiments shown and described herein.
Figure 6B:
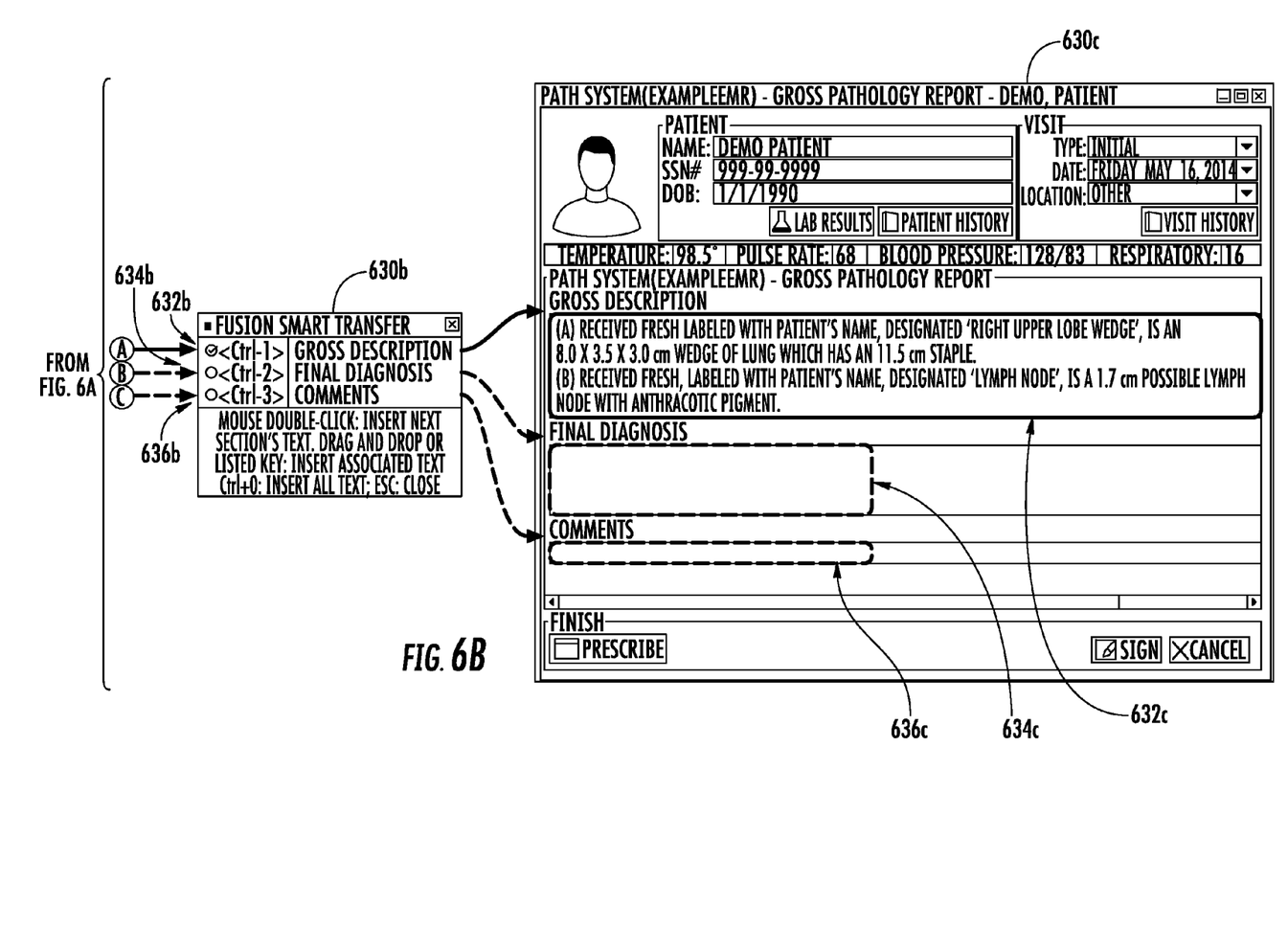

FIGS. 6A-6B depict user interfaces 630*a*-630*c* of the transcription application and the destination application with a dialog box for transferring portions of text to the destination application, according to one or more embodiments shown and described herein. As illustrated, in FIG. 6A, the user interface 630*a* is associated with a transcription application and provides a pathology report. The pathology report includes a "gross description" segment 632*a*, with subsegments (A) and (B). Also included is a "final diagnosis" segment 634*a*, and a "comments" segment 636*a*.

Accordingly, in response to selection of a complete option 342 from FIG. 3 (and/or during creation of the text data depicted in the user interface 630*a*), the transcription application may cause a dialog box 630*b* to be provided (FIG. 6B). As illustrated in FIG. 6B, the dialog box 630*b* may include a listing of one or more of the segments that were identified from the transcribed document provided in the user interface 630*a*. Specifically depicted in the dialog box 630*b* is an option 632*b* associated with the gross description segment 632*a*, an option 634*b* associated with the final diagnosis segment 634*a*, and an option 636*b* associated with the comments segment 636*a*. Also included are designated hotkeys associated with each of the options 632*b*, 634*b*, 636*b*.

Also provided in FIG. 6B is a user interface 630*c* associated with a destination application. As illustrated, the destination application may include a text editor for inputting and/or editing text data. Accordingly, the user may position a cursor and select a hotkey that inserts text data corresponding to a predetermined segment into a text area of the user interface 630*c*. Similarly, some embodiments may be configured for the user to "drag and drop" one of the options 632*b*, 634*b*, 636*b* into the predetermined text area of the user interface 630*c*. Some embodiments may be configured for the user to "double click," "right click," activate a foot pedal, provide other mouse-related command, and/or provide other predetermined command to insert a next sequential segment into the selected text area in the user interface 630*c* (such as when a suggestion is made regarding where to insert the selected text).

As an example, some embodiments are configured to suppress a "right click" command into the destination application when enabled so there is not a conflict from other commands. In the "double-click" scenario, embodiments may be configured to allow the first "click" of the "double-click" to pass through to the destination application so that the target text area receives focus. The "second click" is suppressed and used as the trigger to transfer the text to the destination application.

It should also be understood that some embodiments may be configured to automatically insert a predetermined segment from the user interface 630*a* into the user interface 630*c*. As an example, the user interface 630*a* has the headers "gross description," "final diagnosis," and "comments." Similarly, the user interface 630*c* includes text fields with headers "gross description," "final diagnosis," and "comments." Accordingly, some embodiments may be configured to automatically insert the text data correspond to those headers into the appropriate fields in the user interface 630*c*. This may be performed automatically (e.g., in response to selection of the complete option 342 in the transcription application) and/or in response to a selection of an automatic insert option (not specifically depicted in FIG. 6). Still some embodiments may be configured to make the association between headers of the text data and headers in the destination application and make suggestions for inserting the appropriate text data.

Figure 7A:
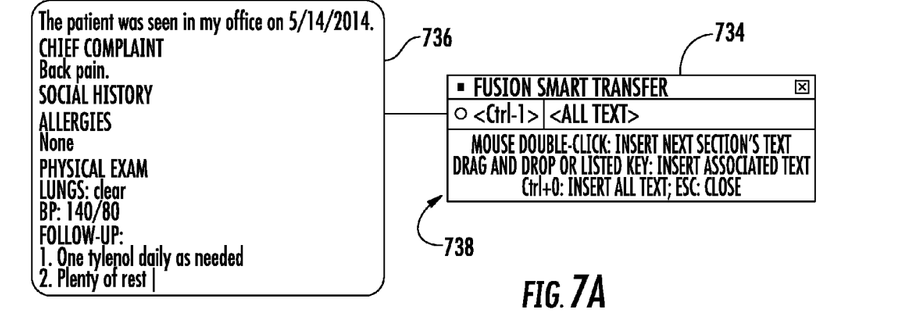
FIGS. 7A-7C depict a plurality of embodiments of the dialog box for transferring text to the destination application, according to one or more embodiments shown and described herein.
Figure 7B:
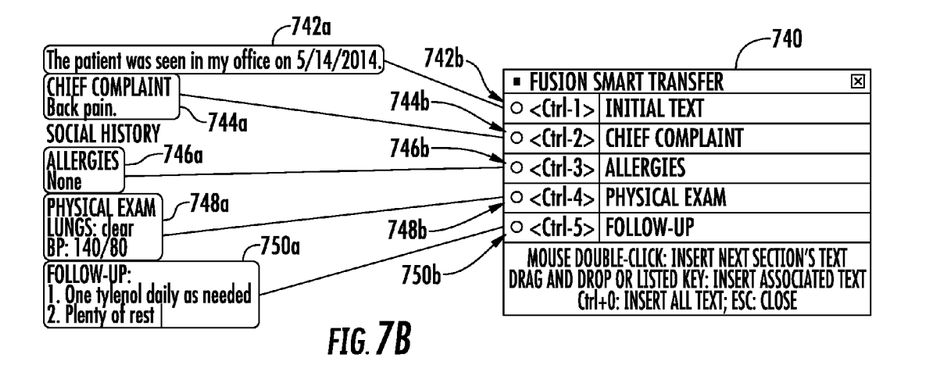
Figure 7C:
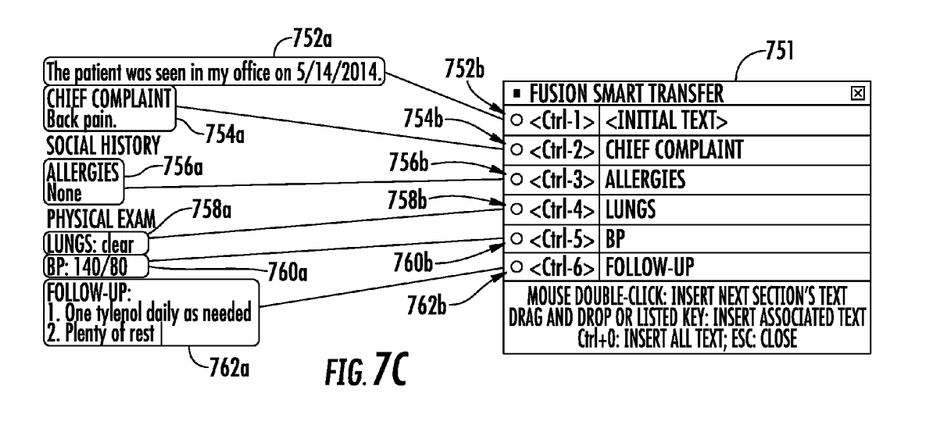

FIGS. 7A-7C depict a plurality of embodiments of the dialog box 730a-730c for transferring text to the destination application, according to one or more embodiments shown and described herein. Specifically, some embodiments may provide configuration options for determining segments is text data. As an example, some embodiments may be configured to identify a predetermined metadata tag for indicating a new segment. Similarly, some embodiments may be configured for selecting all text as a single segment.

Accordingly, FIG. 7A depicts text data 736 that is provided via a transcription application. In response to selection of the complete option 342 (or in response to other triggering mechanism), a dialog box 734 may be provided. As illustrated, an <all text> option is provided whereby the user may insert all of the text data 736 as a single segment. In such an embodiment, the headers (designated with capital letters) would also be included in the text data that is inserted into the text area of the destination application.

FIG. 7B illustrates an embodiment where the transcription application is configured to identify segments according to a predetermined header characteristic. As illustrated, the header characteristic may include capitalized lettering, such that any text after the header is included in a new segment. Additionally, if the text data does not begin with a header, the transcription application may determine that this text is "initial text" and/or assign a different segment name to that portion of the text data.

Specifically, FIG. 7B illustrates that introductory text may be identified as a first segment 742a and corresponds the first segment 742a with a first option 742b in the dialog box 740. Additionally, the transcription application may identify that the words "chief complaint" are capitalized (or have other signifier) and thus identify this as a header. Thus, the phrase "back pain" is identified as a second segment 744a that is associated with a second option 744b. Because the words "social history" do not include any non-capitalized text (e.g., text to be inserted into the destination application), the embodiment of FIG. 7B ignores this header and advances to the word "allergies," which includes a third segment 746a with the word "none." The third segment is associated with a third option 746b in the dialog box 740.

Also included is a fourth segment 748a, which includes a header "physical exam." As illustrated, this header includes two sub-headers "lungs" and "BP." In this particular embodiment, the transcription application may not identify the sub-headers and assume that the text in this segment is all part of the same grouping. As a consequence, all of this data may be associated with a fourth option 748b in the dialog box 740. A fifth segment 750a is also identified with two sub-headers "1" and "2." Again, in this embodiment, these are not identified any differently than any other text that follows a header.

It should be understood that in the embodiment of FIG. 7B, the text "BP" was not identified as a header to create a new segment. In this embodiment, the header may be required to be words with all capitals that does not include any punctuation (such as a colon). Since "BP" was followed by a colon, the transcription application may cause the user computing device 102 to not consider this text as a header, but instead as text within a segment. Other rules for identifying headers may also be implemented, depending on the particular use of this functionality.

FIG. 7C illustrates another embodiment of the segmenting of text data. Similar to the embodiment of FIG. 7B, this embodiment may be configured to identify sub-headers for creating sub-segments of the text data. Specifically, while the segments 752a, 754a, 756a, and 762a correspond with options 752b, 754b, 756b, and 762b, similar to FIG. 7B, a sub-header has been identified. In this embodiment, the transcription application identified a header "physical exam" due to the capitalization of the words with a corresponding sub-segment associated with the sub-header. Additionally, this embodiment is configured to identify a sub-header where text is followed by a colon, which is followed by additional text. Accordingly, this embodiment identified sub-headers "lungs" and "BP" under the "physical exam" header. Thus, two sub-segments 758a and 760a correspond to options 758b and 760b in the dialog box 751.

It should be understood that while the embodiments of FIGS. 7A-7C were not configured to identify "1" or "2" as sub-headers, some embodiments may be configured to identify any of a plurality of different identifiers as the beginning of a header or sub-header. Additionally, some embodiments may be configured accordingly.

Figure 8:
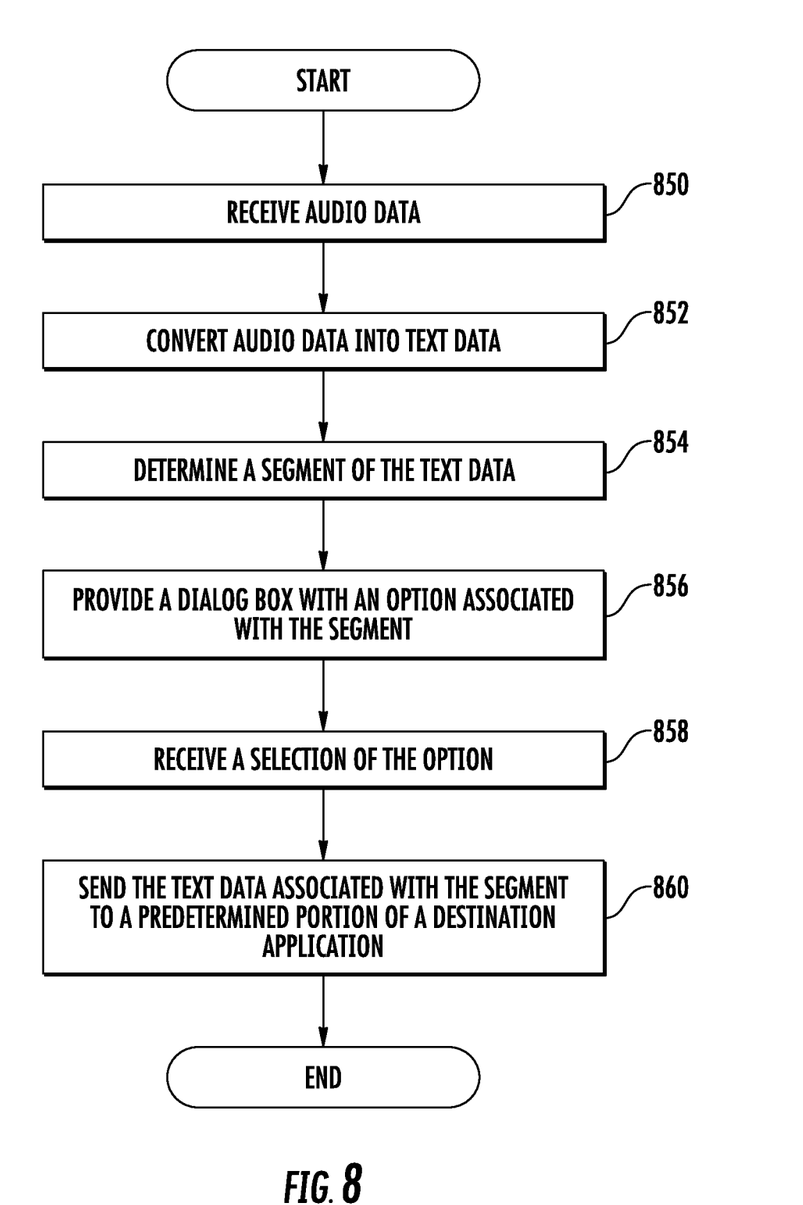
FIG. 8 depicts a flowchart for transcription transfer, according to one or more embodiments shown and described herein.

FIG. 8 depicts a flowchart for transcription transfer, according to one or more embodiments shown and described herein. As illustrated in block 850, audio data may be received. As discussed above, the audio data may be received from a user, a recording, and/or via other mechanism. Regardless, in block 852, the audio data may be converted into text data. This conversion may be performed by the user computing device 102, the remote computing device 104, by a user, and/or via other mechanism. In block 854, a segment of the text data may be determined. As discussed with regard to FIGS. 7A-7C segments may be determined by first identifying a header according to one or more predetermined rules. Based on the identification of a header (and/or sub-header), a segment may be identified. In block 856, a dialog box with an option associated with the segment may be provided. In block 858, a selection of the option may be received. In block 860, the text data associated with the segment may be sent to a predetermined portion of a destination application.

It should be understood that embodiments described herein may be configured to provide options for inserting text from a first application into a destination application. Because the embodiments may be configured to divide the text data into one or more segments, different portions of the text data may be inserted into different fields of the destination application without complication.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for transcription transfer, comprising:
 a user computing device that includes a processor and a memory component, the memory component storing a transcription application and a destination application, such that when the transcription application is executed by the processor, the system performs at least the following:
 determine text data associated with audio data received from a user;

determine a segment of the text data;
provide a dialog box associated with the text data, wherein the dialog box includes an option associated with the segment;
receive a user selection of the option; and
send text data associated with the segment to a predetermined portion of a user interface provided by the destination application.

2. The system of claim 1, wherein the transcription application further causes the system to perform at least the following:
determine a header in the text data; and
in response to determining the header, determining the segment in the text data.

3. The system of claim 1, wherein the transcription application further causes the system to determine a sub-segment of the text data.

4. The system of claim 1, wherein the transcription application further causes the system to perform at least the following:
determine a header in the text data;
determine whether the header corresponds with a field header in the user interface that is provided by the destination application; and
in response to determining that the header corresponds with the field header in the user interface that is provided by the destination application, automatically insert the segment into a portion of the user interface that is provided by the destination application that corresponds with the field header.

5. The system of claim 1, wherein the user selection of the option includes at least one of the following: selection of a hotkey, a predetermined command at a cursor position, and a drag and drop command.

6. The system of claim 1, wherein the transcription application further causes the system to transcribe the audio data into the text data.

7. The system of claim 1, further comprising a remote computing device that causes the system to transcribe the audio data into the text data.

8. The system of claim 1, wherein the destination application is not specifically configured to communicate with the transcription application.

9. The system of claim 1, wherein the transcription application further causes the system to determine a header in the text data, and wherein the header is determined using at least one of the following: capitalization in the text data, punctuation in the text data, text position in the text data, and metadata associated with the text data.

10. A method for transcription transfer, comprising:
receiving text data in an electronic format;
determining a header in the text data;
in response to determining the header in the text data, determining a segment associated with the header;
providing a dialog box associated with the text data, wherein the dialog box includes a first option for inserting the segment into a user interface provided by a destination application;
receiving a user selection of the first option; and
inserting the segment into a predetermined portion of the user interface provided by the destination application.

11. The method of claim 10, further comprising:
determining whether the text data includes a sub-header associated with the header;
determining a sub-segment of the text data that corresponds to the sub-header; and
including a second option for inserting the sub-segment into the user interface provided by the destination application.

12. The method of claim 10, further comprising:
determining whether the header corresponds with a field header in the user interface that is provided by the destination application; and
in response to determining that the header corresponds with the field header in the user interface that is provided by the destination application, automatically inserting the segment into a portion of the user interface that is provided by the destination application that corresponds with the field header.

13. The method of claim 10, wherein the user selection of the first option includes at least one of the following: selection of a hotkey, a predetermined command at a cursor position, and a drag and drop command.

14. The method of claim 10, further comprising:
receiving audio data; and
transcribing the audio data into the text data.

15. The method of claim 10, wherein the header is determined using at least one of the following: capitalization in the text data, punctuation in the text data, text position in the text data, and metadata associated with the text data.

16. A non-transitory computer-readable medium that includes logic that, when executed by a computing device, causes the computing device to perform at least the following:
receive audio data from a user;
transcribe the audio data to create text data associated with audio data;
insert the text data into a user interface associated with a transcription application;
determine a header in the text data;
determine, from the header, a segment of the text data;
provide a dialog box, wherein the dialog box includes an option for inserting the segment into a user interface provided by a destination application;
receive a user selection of the option; and
insert text data associated with the segment into a predetermined portion of the user interface provided by the destination application.

17. The non-transitory computer-readable medium of claim 16, wherein the logic further causes the computing device to perform at least the following:
determine whether the text data includes a sub-header associated with the header;
determine a sub-segment of the text data that corresponds to the sub-header; and
include a second option for inserting the sub-segment into the user interface provided by the destination application.

18. The non-transitory computer-readable medium of claim 16, wherein the logic further causes the computing device to perform at least the following:
determine whether the header corresponds with a field header in the user interface that is provided by the destination application; and
in response to determining that the header corresponds with the field header in the user interface that is provided by the destination application, automatically insert the segment into a portion of the user interface that is provided by the destination application that corresponds with the field header.

19. The non-transitory computer-readable medium of claim 16, wherein the user selection of the option includes at least one of the following: selection of a hotkey, a predetermined command at a cursor position, and a drag and drop command.

20. The non-transitory computer-readable medium of claim 16, wherein the header is determined using at least one of the following: capitalization in the text data, punctuation in the text data, text position in the text data, and metadata associated with the text data.

* * * * *

UNITED STATES PATENT AND TRADEMARK OFFICE
CERTIFICATE OF CORRECTION

PATENT NO. : 9,576,577 B2  
APPLICATION NO. : 14/624833  
DATED : February 21, 2017  
INVENTOR(S) : Curtis A. Weeks Page 1 of 1

It is certified that error appears in the above-identified patent and that said Letters Patent is hereby corrected as shown below:

On the Title Page

Item (71) Applicant, change "Dolby & Company, Inc." to --"Dolbey & Company, Inc."--

Signed and Sealed this  
Twenty-fifth Day of April, 2017

Michelle K. Lee  
*Director of the United States Patent and Trademark Office*